(12) United States Patent
Bärthlein et al.

(10) Patent No.: US 9,327,337 B2
(45) Date of Patent: May 3, 2016

(54) EXPANSION HEAD FOR EXPANSION TOOLS AND EXPANSION TOOL COMPRISING SAID EXPANSION HEAD

(71) Applicants: Sebastian Bärthlein, Erlangen (DE); Sven Christoph, Weisendorf (DE); Richard Sapper, Schwabach (DE)

(72) Inventors: Sebastian Bärthlein, Erlangen (DE); Sven Christoph, Weisendorf (DE); Richard Sapper, Schwabach (DE)

(73) Assignee: Rehau AG + Co, Rehau (DE)

( * ) Notice: Subject to any disclaimer, the term of this patent is extended or adjusted under 35 U.S.C. 154(b) by 0 days.

(21) Appl. No.: 14/375,142

(22) PCT Filed: Feb. 1, 2013

(86) PCT No.: PCT/EP2013/000311
§ 371 (c)(1),
(2) Date: Jul. 29, 2014

(87) PCT Pub. No.: WO2013/113508
PCT Pub. Date: Aug. 8, 2013

(65) Prior Publication Data
US 2015/0000368 A1    Jan. 1, 2015

(30) Foreign Application Priority Data

Feb. 3, 2012   (DE) ..................... 20 2012 100 361 U

(51) Int. Cl.
| | |
|---|---|
| *B21D 22/06* | (2006.01) |
| *B21D 41/02* | (2006.01) |
| *B29C 57/04* | (2006.01) |
| *B29K 105/00* | (2006.01) |
| *B29L 23/00* | (2006.01) |

(52) U.S. Cl.
CPC .............. B21D 41/028 (2013.01); B29C 57/04 (2013.01); *B29K 2105/258* (2013.01); *B29L 2023/22* (2013.01)

(58) Field of Classification Search
CPC ................. B21D 41/028; B29C 57/04; B29K 2105/258; B29L 2023/22
USPC ........................................................... 72/393
See application file for complete search history.

(56) References Cited

U.S. PATENT DOCUMENTS

| | | | | |
|---|---|---|---|---|
| 292,167 | A * | 1/1884 | Lytle | 279/2.12 |
| 1,918,640 | A * | 7/1933 | Greninger | 72/393 |
| 4,870,853 | A * | 10/1989 | Ferguson | 72/393 |
| 5,970,776 | A * | 10/1999 | Iijima et al. | 72/353.4 |
| 7,128,560 | B2 * | 10/2006 | Tandart | 425/392 |

FOREIGN PATENT DOCUMENTS

| | | |
|---|---|---|
| EP | 0 718 057 A2 | 6/1996 |
| EP | 2 130 664 A1 | 12/2009 |

* cited by examiner

*Primary Examiner* — David B Jones
(74) *Attorney, Agent, or Firm* — Da Vinci Partners LLC; John Moetteli

(57) ABSTRACT

An expansion head for expansion tools for hollow workpieces, particularly for the ends of plastic pipes and metalplastic composite pipes, comprising a union cap having a guide flange directed radially inward, and a set of expandable jaws of sector-shaped design, each received individually by an inner flange sector overlapping the guide flange so that they are radially movable in the union cap, wherein the set of sector-shaped expandable jaws is movable between a closed state and an expansion state, and in a closed state, an approximately cylindrical lateral area is formed by an envelope of the outer walls of the set of expandable jaws, wherein characterized in that each expandable jaw is provided with at least one recess extending in the direction of the longitudinal axis of the expandable jaws so that in a closed state of the expansion head, the surface of the outer walls of the set of expandable jaws corresponds to 25% to 75% of the surface of the envelope of the outer walls of the set of expandable jaws.

20 Claims, 3 Drawing Sheets

EXPANSION HEAD FOR EXPANSION TOOLS AND EXPANSION TOOL COMPRISING SAID EXPANSION HEAD

CROSS REFERENCE TO RELATED APPLICATIONS

This application is the National Stage of International Application No. PCT/EP2013/000311, filed Feb. 1, 2013, which claims benefit under 35 USC §119(a), to German patent application Ser. No. 20 2012 100 361.9, filed Feb. 3, 2012.

The present invention relates to an expansion head for expansion tools for hollow workpieces, particularly for the ends of plastic pipes and metal-plastic composite pipes, wherein the expansion head comprises a union cap having a guide flange directed radially inward, and a set of sector-shaped expandable jaws, each received individually by an inner flange sector, which overlaps the guide flange so as to be radially movable in the union cap, wherein the set of sector-shaped expandable jaws is movable between a closed state and an expansion state, an in a closed state, an envelope of the outer walls of the set of expandable jaws forms an approximately cylindrical lateral area.

Such expansion heads are known from EP 0 718 057 A2 and EP 0 878 287 A1, for example. The expansion heads consist of individual segments, the so-called expandable jaws, the base parts of which are jointly accommodated in a union cap, and which are movable outwardly in a radial direction, and which are separated from one another by separating joints. Expansion heads such as these are mounted on expansion tools and are connected thereto, particularly by way of a screw connection. Basically, the expansion tools are constructed of a pressing tool having a mandrel that is held in or on the housing of the pressing tool in an axially movable manner, and which in its axial end region is provided with a conical surface, and of an expansion head, which preferably can be fixed to the pressing tool by way of a receiving device for the expansion head. By way of a drive device, which can be manually or mechanically driven, the mandrel is moved in an axial direction in the direction of the expansion head. On the inner side, the expandable jaws of the expansion head define a central conical-shaped receptacle, in which the conical surface of the mandrel, which can be moved in an axial direction by the pressing tool, engages. When the pressing tool is actuated, the mandrel is pressed into the expansion head, wherein a contact is made between the conical surface of the mandrel and the receptacle formed by the expandable jaws. In a further axial movement of the mandrel in the direction of the expansion head, the expandable jaws are pressed radially outwards, and a radial lift of the expandable jaws takes place so that the expandable jaws expand the ends of a hollow workpiece, in particular a plastic pipe or a metal-plastic composite pipe, into which the expansion head is inserted. The expandable jaws transition thereby from a closed state into the expansion state. In a radial reverse movement of the mandrel from the expansion head, the segments are moved back to their initial position by way of resetting means (an annular tension spring or an elastic O-ring, for example). In order to be able to achieve, during the expansion process, an expansion of the hollow workpiece that is as uniform as possible, it may be necessary to rotate the position of the expansion head in the pipe end at a defined angle, after loosening the expandable jaws (with expansion heads having six expandable jaws, the rotation should be done at an angle of preferably about 30°), and having to carry out a second expansion process. A uniform expansion of a pipe end is necessary so that after insertion of a connection piece by means of pressing with a sliding sleeve or pressing sleeve (axial sliding of a sliding sleeve over the pipe end with connection piece inserted therein in a sliding sleeve connection, that is, radial pressing of a pressing sleeve over a pipe end with connection piece inserted therein), a tight connection is achieved. In order to avoid an imprinting of the sharp-edged separating joints into the material of the pipe to be expanded, EP 0 718 057 A2 proposes to break the expandable jaws on both sides of each separating joint at the axially parallel edges of the work surface. However, such breaking of the edges at the separating joints has the disadvantage that the gap between two adjacent expandable jaws becomes bigger so that the support surface of the expandable jaw inserts on the inner wall of the pipe is smaller, which makes it necessary to carry out an expansion with a greater axial lift. The risk as a result thereof is too large an expansion of the pipe material while weakening the pipe or deterioration of its elastic properties. According to EP 0 878 287 A1, this problem is solved such that the work surface, that is, the surface of the expandable jaws that rests on the inner wall of the pipe during the expansion process, is in the area of each of its flanks to the separating joints provided with a flat spot, which at the side of the expandable jaw located next to said work surface is at right angles. The expansion heads described in these documents ensure a gentle expansion of the pipe. However, in carrying out an expansion process by using an expansion head of this kind, a considerable expenditure of force is required, particularly with larger pipe diameters (for example, a pipe diameter of about 25 mm and up).

In light of this background, the present invention is based on the idea of providing an expansion head that overcomes the disadvantages of the prior art. The expansion head according to the invention results in a reduced expenditure of force, even when manually operated, particularly with relatively thick-walled pipes. Furthermore, the service life of the expansion head and the expansion tools used therewith is increased, A further object of the present invention is to provide a corresponding expansion tool having an expansion head according to the invention.

These and other objectives are met by an expansion head having the characteristics of claim 1, that is, by an expansion tool having the characteristics of claim 10, Preferred embodiments of the expansion head according to the invention are described in the dependent claims. The fundamental functional manner of the expansion tool according to the invention corresponds to the functional manner as described herein in the context of expansion heads described in EP 0 718 057 A2 and EP 0 878 287 A1.

According to the present invention, it was realized that the force required for carrying out an expansion process can be reduced, if the surface of the expandable jaws resting on the inner side of the pipe is reduced. When using manual expansion tools in an expansion process, the first expansion process in particular requires a great expenditure of force, especially with large pipe diameters, whereas the second expansion process is, relative to the first one, very easy. If the surface, with which the expandable jaws rest on the inner side of the pipe prior to the first expansion process, is reduced, the force required for the pipe expansion is more evenly distributed between the first and the second expansion process. For a sufficient reduction of the expenditure of force for the expansion, particularly of pipes having a larger pipe diameter, a reduction of the contact surface of the expandable jaws on the inner side of the pipe of at least 25% is required, whereas a reduction of the contact surface of the expandable jaws on the inner side of the pipe of more than 75% poses the risk of an mechanical weakening of the expansion head according to the invention. By rotating the expansion head at an angle corresponding to about half the opening angle of the sector formed by an expandable jaw (with a set of six expandable jaws, at about 30°, or at an angle of an integer multiple of the opening angle of the sector plus about 30°) prior to carrying out the second expansion process, the pipe is then completely expanded during the second expansion process. Since pipes having a large pipe diameter are relatively thick-walled, a gentle expansion of the pipe is of little importance. Furthermore, the decreased expenditure of force reduces the maximal force in the expansion head and in the expansion tool so that in this way, the service life of these components can be increased.

It is therefore the object of the present invention to provide an expansion head for expansion tools for hollow workpieces, particularly for the ends of plastic pipes and metal-plastic composite pipes, comprising a union cap having a guide flange directed radially inward, and a set of expandable jaws of sector-shaped design, each received individually by an inner flange sector overlapping the guide flange so as to be radially movable in a union cap, in particular, are guided by the inner flange sector in a radial groove of the union cap in a radially movable manner on the guide flange, wherein the set of sector-shaped expandable jaws is movable between a closed state and an expansion state, and in a closed state, an envelope of the outer walls of the set of expandable jaws forms an approximately, wherein each expandable jaw is provided with at least one recess extending in the direction of the longitudinal axis of the expandable jaws so that in a closed state of the expansion head, the surface of the outer walls of the set of expandable jaws is equal to 25% to 75% of the surface of the envelope of the outer walls of the set of expandable jaws.

The term "envelope of the outer walls" as used herein refers to the envelope of a cylinder approximately formed by the outer walls of the expandable jaws in a closed state of the expansion head according to the invention, if the recess(es) in the expandable jaws would not be present, and approximately constitutes a corresponding cylindrical lateral area.

It can thereby be beneficial if the recess is arranged approximately in the center of the outer wall of the expandable jaw. Such an arrangement of the recess allows an even expansion of the pipe end after the second expansion process.

It can likewise be beneficial if at least one of the expandable jaws is provided with at least two recesses. In this way, the mechanical weakening of the expandable jaws is distributed among several points, which promotes the longevity of the expansion head according to the invention. In this context, it can be of particular advantage if one recess each is arranged at each lateral edge of the outer wall of each expandable jaw. In this way, the recesses of two adjacent expandable jaws complement one another to form a corresponding recess having a greater width so that a smaller contact surface of the expandable jaws on the inner wall of the pipe with high mechanical stability, and thus longevity of the expansion head according to the invention is ensured. It can thereby be particularly beneficial if the two recesses respectively arranged at the lateral edge of the outer wall extend across the entire thickness of the expandable jaw.

In the event of several recesses on the outer surface of an expandable jaw, it can also be advantageous if the recesses are arranged approximately symmetrical to a center axis of the outer wall of the respective expandable jaw extending in the longitudinal direction of the expansion head. This contributes to high mechanical stability and a long life cycle of the expansion head according to the invention.

It can also be helpful if on the side facing away from the union cap, the expandable jaws are provided with a tapering or chamfer. In this way, a smooth transition can be achieved between the expanded and the not expanded part of the hollow workpiece after the expansion process.

It can likewise be of advantage, if the edges of the expandable jaws are rounded, broken, or chamfered. The result of this is that the expandable jaws imprint themselves into the material of the inner wall of the pipe to a lesser extent during the expansion process so that a more solid pipe connection can be formed.

It can also be beneficial if in a closed state of the expansion head, the surface of the outer walls of the set of expandable jaws corresponds to 40% to 60%, particularly 45% to 55%, and preferably 48% to 52% of the surface of the envelope of the outer walls of the set of expandable jaws. In this manner, the expenditure of force is especially evenly divided between the first and the second expansion process.

In the following, the present invention is described in detail with reference to the embodiment illustrated in the figures. It should be understood that the scope of the present invention is not to be limited to the illustrated embodiments.

DETAILED DESCRIPTION OF PREFERRED EMBODIMENTS

Figure 1A:
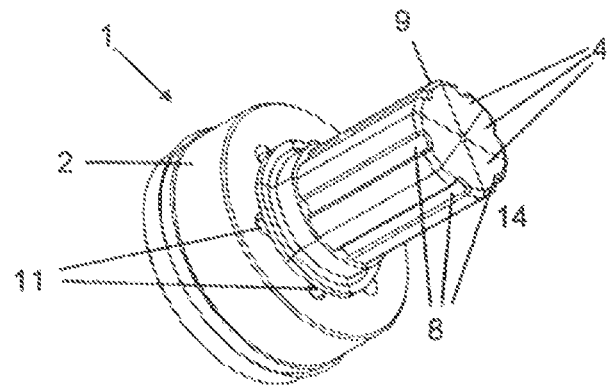
FIG. 1a shows a perspective view of an expansion head according to an embodiment the present invention in a closed state.
Figure 1B:
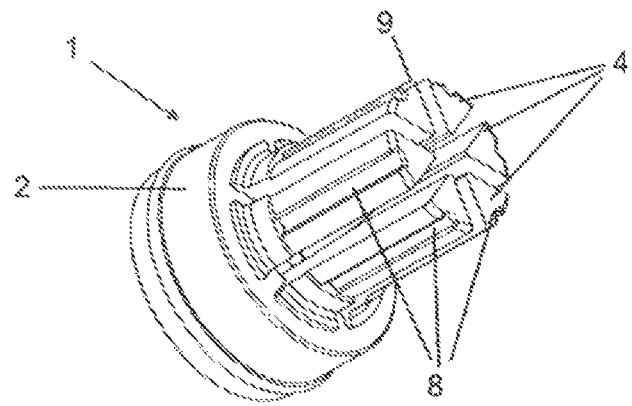
FIG. 1b shows a perspective view of the illustrated in FIG. 1a in an open state.
Figure 1C:
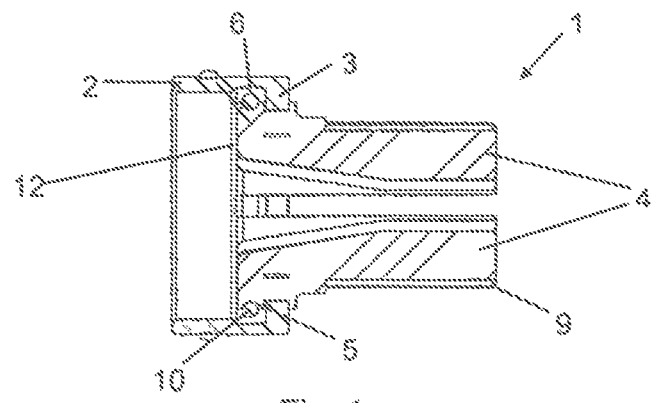
FIG. 1c shows a cross-sectional view of the expansion head illustrated in FIG. 1b in an open state.
Figure 1D:
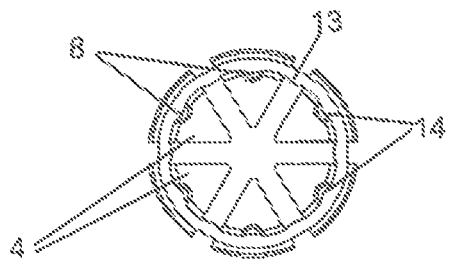
FIG. 1d shows a top view of the expandable jaws of the expansion head illustrated in FIG. 1b with a fitted pipe end after the first expansion process.

In FIG. 1, an expansion head according to an embodiment of the present invention is shown in a closed state (FIG. 1a), and in an open state or expansion state (FIG. 1b to FIG. 1d). The expansion head 1 according to the invention comprises a set of six expandable jaws 4 and a union nut 2, wherein the expandable jaws 4 are guided through the opening of the union nut 2. In a closed state, the parts of the expandable jaws 4 protruding from the union nut 2 form an approximately cylinder-shaped expansion area. In a closed state, the outer wall 7 of the expandable jaws 4 has an approximately cylindrical lateral surface. The "expansion area" referred to herein is the area of the expansion head 1, in which the hollow workpiece to be expanded is located during the expansion process. This rests thereby on the exterior side of the expandable jaws 4. Together, the set of sector-shaped expandable jaws 4 in a closed state of the expansion head 1 has a closed form with an essentially cylindrical shape in the expansion area of the expansion head 1. On the side facing away from the union cap 2, the expandable jaws 4 are each provided with a tapering 9 or a chamfer, which preferably is formed as a rounded edge area. By means of such a tapering 9 or chamfer a smooth transition between the expanded and the not expanded portion of the hollow workpiece can be achieved after the expansion process.

Each expandable jaw 4 is thereby of sector-shaped design, and on the outer wall 7 is provided with a recess 8 extending in the direction of the longitudinal axis of the expandable jaws 4. The recess 8 is thereby centrally formed in the outer surface 7 of the expandable jaw 4, and is provided with a semi-circular cross section. In other embodiments of the present invention, as an alternative, other cross sections, for example, oval, triangular, rectangular, square cross sections, and combinations of the listed cross-sectional shapes are possible. Overall, in a closed state of the expansion head 1, the recesses 8 of the expandable jaws 4 extend across about 30% of the surface of the envelope of the outer walls 7 of the set of expandable jaws. At their deepest point, he recesses 8 have a depth that corresponds to about 15% of the diameter of the cylinder formed by the expandable jaws 4.

The expansion head 1 illustrated in FIG. 1a is shown in an open state. The expandable jaws 4 are each arranged offset radially outwards so that they are now arranged spaced apart from one another.

As the cross-sectional view of the expansion head 1 in FIG. 1c shows, the union cap 2 is provided with a guide flange 3 directed radially upward, and with a set of sector-shaped expandable jaws 4, Each of the sector-shaped expandable jaws 4 is individually guided in a radially movable manner by an inner flange sector 5, which overlaps the guide flange 3, in a radial groove 6 in the union cap 2. On their outer sides, the inner flange sectors 5 are provided with groove sectors, which in the total circumference of the expansion head 1 become a circumferential groove on the outside of the inner flange sectors 5, in which an annular return means 10 for returning the expandable jaws 4 from the open to the closed state of the expansion head 1 is accommodated. Preferable, the return means 10 is thereby selected such that its restoring force for returning the expandable jaws 4 from the open to the closed state is sufficient. In the illustrated embodiment, the return means 10 is an elastic O-ring. As an alternative, an annular tension spring can also be used in a beneficial way. In each of the inner flange sectors 5, there is a bore, in each of which an end of a guide pin is received.

In the guide flange 3, radial guide grooves 11 (FIG. 1a) for the accommodation and movement of guide pins are arranged. The number of the guide grooves 11 corresponds thereby to the number of guide pins, and thus the number of expandable jaws 4 of the expansion head 1. The guide pins can be fixedly connected to the inner flange sectors, by way of a press fit in the associated bore in the inner flange sectors. In alternative embodiments of the expansion head 1 according to the invention, one end of the guide pins can be screwed into a screw thread, or can be pin-connected to the inner flange sector 5. Furthermore, the guide pins 8 can also be integrally molded to the respective inner flange sector. Also, a guide need not be used at all.

For axially fixing the expandable jaws 4 in the union cap 2, a fastening means is used. In the embodiment of the expansion head according to the invention as illustrated in FIG. 1c, a fastening disk 12 pressed into the union cap 2 is used as a fastening means for the expandable jaws 4. In alternative embodiments, a securing ring, a disk having a securing ring, or a threaded disk that is installed in a screw thread on the inner side of the union cap 2, can be used as a fastening means. On their inner sides, the expandable jaws 4 are delimited by conical segment surfaces, which in a closed state of the expansion head 1 come together to form a conical surface. The opening angle of the conical segment surfaces correspond thereby to the conical angle of the expansion mandrel of the expansion tool. Hence, the conical surface of the expansion mandrel interacts with the conical segment surfaces of the expandable jaws 4 during the expansion process. By driving the expansion mandrel into the expansion head, the conical surface of the expansion mandrel pushes the conical segment surfaces of the expandable jaws radially outward. If a hollow workpiece, for example, a plastic pipe, is guided over the outer surfaces of the expansion head 1, the outer surfaces of the expansion head 1 initially rest on the inner side of the pipe. With increasing penetration depth of the expansion mandrel, the outer surfaces of the expandable jaws 4 are moved radially outward, by way of which the pipe end, which is guided over the expandable jaws 4, is expanded. In order to reduce the risk of forming longitudinal ridges in the expanded workpiece, the outer edges in longitudinal direction of the expandable jaws 4 can be rounded or chamfered.

A top view of the set of expandable jaws of the expansion head according to the invention with a pipe end 13 seated thereupon after such an expansion process is illustrated in FIG. 1d. In the region of the recesses 8 of each expandable jaw 4, in which the respective expandable jaw 4 does not rest on the inner side of the pipe end 13 prior to the first expansion process, the expanded pipe end is provided with a significant deformation 14. Thus, the expenditure of force during the first expansion process compared to a first expansion process with a traditional expansion head without recesses 8 on the outer side 7 of the expandable jaws 4 is reduced. In contrast, a repetition of the expansion process after a rotation of the expansion tool by about 30° relative to the pipe end 13 requires a correspondingly higher expenditure of force compared to a second expansion process with a traditional expansion head without recesses 8 on the outer surface 7 of the expandable jaws 4.

In the following, the present invention is explained in conjunction with further embodiments. In order to avoid repetitions, the differences are described, and further details of the embodiments shown in FIG. 1a to FIG. 1d are also true for the further embodiments. Reference numerals refer to the same objects.

Figure 2:
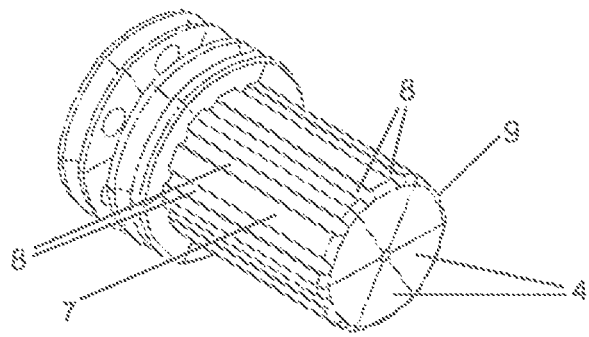
FIG. 2 shows a perspective view of a set of expandable jaws of an expansion head according to a further embodiment of the present invention.

FIG. 2 shows the set of six expandable jaws 4 of an expansion head 1 according to a further embodiment of the present invention in a perspective view, again each provided with a tapering 9 at one end. On the outer wall 7 of each of the sector-shaped expandable jaws 4, two each recesses 8 are arranged extending in the direction of the longitudinal axis of the expandable jaws 4. The recesses 8 are configured approximately symmetrical to the center of the outer surface 7, and again have a semi-circular cross section, wherein other cross-sectional shapes can be used as an alternative. The recesses 8 take up about 50% of the surface of the envelope of the outer walls 7 of the set of expandable jaws in a closed state of the expansion head 1. At the deepest point, the depth of the recess corresponds to about 20% of the diameter of the cylinder formed by the expandable jaws 4.

During the execution of an expansion process at a pipe end 13, deformations 14 are respectively formed on the recesses 8, in this case, two deformations 14 each per expandable jaw 4. During the execution of the first expansion process, the expenditure of force again is reduced compared to a first expansion process using a traditional expansion head without recesses 8 on the outer surface 7 of the expandable jaws 4. In contrast, a repetition of the expansion process after a rotation of the expansion tool by about 30° relative to the pipe end 13 requires a correspondingly increased expenditure of force as compared to the second expansion process with a traditional expansion head without recesses 8 on the outer surface 7 of the expandable jaws 4.

Figure 3:
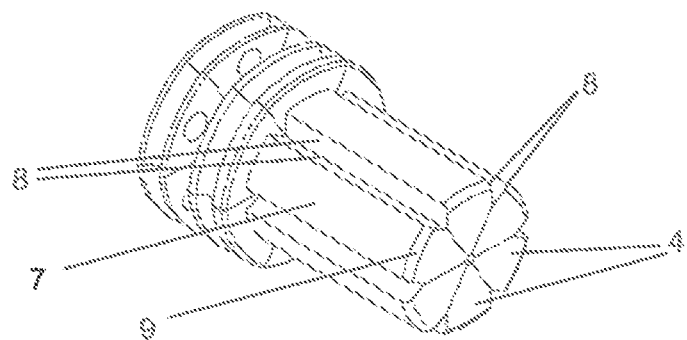
FIG. 3 shows a perspective view of a set of expandable jaws of an expansion head according to a further embodiment of the present invention.

An additional set of six expandable jaws 4 of an expansion head 1 according to a further embodiment of the present invention is illustrated in FIG. 3 in a perspective view. Again, on the outer wall 7 of each of the sector-shaped expandable jaws 4, two each recesses 8 are disposed to extend in the direction of the longitudinal axis of the expandable jaws 4. In this embodiment of the present invention, the recesses 8 are arranged at the lateral edge of the expandable jaws 4. The recesses 8 are each configured as bevels so that two recesses 8 of each adjacent expandable jaw form a triangular recess. As an alternative, other cross-sectional forms can also be used. Together, the recesses 8 correspond to about 30% of the surface of the envelope of the outer walls 7 of the set of expandable jaws in a closed state of the expansion head 1. At the deepest point, the depth of the recess corresponds to about 35% of the diameter of the cylinder formed by the expandable jaws 4.

During the executing of an expansion process on a pipe end 13, a deformation of the pipe end 13 is formed at the apertures formed by the recesses 8. During the execution of the first expansion process, the expenditure of force is also reduced for this embodiment compared to a first expansion process using a traditional expansion head without recesses 8 on the outer surface 7 of the expandable jaws 4. A repetition of the expansion process after a rotation of the expansion tool by about 30° requires, however, a correspondingly increased expenditure of force compared to the second expansion process with a traditional expansion head without recesses 8 on the outer surface 7 of the expandable jaws 4.

Figure 4:
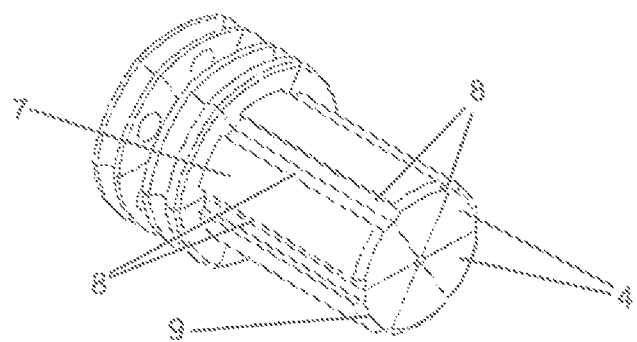
FIG. 4 shows a perspective view of a set of expandable jaws of an expansion head according to a further embodiment of the present invention.

A perspective view of the set of six expandable jaws 4 of an expansion head 1 according to a further embodiment of the present invention is shown in FIG. 4. In this embodiment, recesses 8 are also arranged at the lateral edge of the sector-shaped expandable jaws 4 each extending in a direction of the longitudinal axis of the expandable jaws 4. However, these are provided with a right-angled cross-section, so that the recesses 8 of adjacent expandable jaws also form a right-angled aperture. Alternatively, other cross-sectional shapes can be used here. The recesses 8 take up about 25% of the surface of the envelope of the outer walls 7 of the expandable jaws in a closed state of the expansion head 1. The depth of the recess corresponds to about 10% of the diameter of the cylinder formed by the expandable jaws 4.

During the execution of an expansion process at a pipe end 13, a deformation of the pipe end 13 is respectively formed at the apertures formed by the recesses 8. During the execution of the first expansion process, the expenditure of force is also reduced for this embodiment compared to a first expansion process with a traditional expansion head without recesses 8 on the outer surface 7 of the expandable jaws 4. In contrast, a repetition of the expansion process after a rotation of the expansion tool by about 30° relative to the pipe end 13 requires a correspondingly increased expenditure of force compared to the second expansion process using a traditional expansion head without recesses 8 on the outer surface 7 of the expandable jaws 4.

Figure 5:
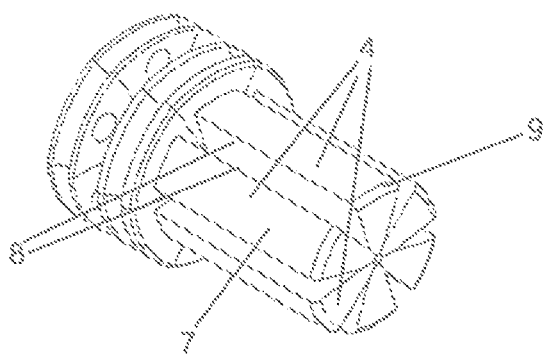
FIG. 5 shows a perspective view of a set of expandable jaws of an expansion head according to a further embodiment of the present invention.

In FIG. 5, a further set of six expandable jaws 4 of an expansion head 1 according to a further embodiment of the present invention is illustrated in a perspective view. On the outer wall 7 of each of the section-shaped expandable jaws 4, two each recesses 8 are disposed to extend in the direction of the longitudinal axis of the expandable jaws 4. In this embodiment of the present invention, the recesses 8 are again located at the lateral edge of the expansion jaws 4, and are each configured as bevels. In this way, two recesses 8 of each adjacent expandable, jaws together form a triangular aperture extending to the center axis of the cylinder formed by the expandable jaws 4, As an alternative, other cross-sectional forms can also be used here. Together, the recesses 8 correspond to about 35% of the surface of the envelope of the outer walls 7 of the set of expandable jaws in a closed state of the expansion head 1. At its deepest point, the depth of the recess corresponds to about 40% of the diameter of the cylinder formed by the expandable jaws 4.

During the execution of an expansion process at a pipe end 13, a deformation of the pipe end 13 is respectively formed at the apertures formed by the recesses 8. During the execution of the first expansion process, the expenditure of force is also reduced for this embodiment compared to a first expansion process using a traditional expansion head without recesses 8 on the outer surface 7 of the expandable jaws 4. In contrast, a repetition of the expansion process after a rotation of the expansion tool by about 30° relative to the pipe end 13 requires a correspondingly increased expenditure of force compared to the second expansion process using a traditional expansion head without recesses 8 on the outer surface 7 of the expandable jaws 4.

Figure 6:
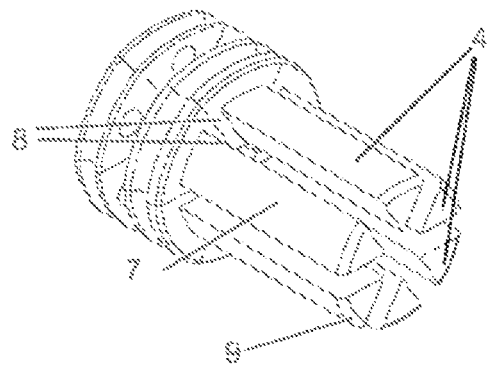
FIG. 6 shows a perspective view of a set of expandable jaws of an expansion head according to a further embodiment of the present invention.

FIG. 6 shows an additional set of six expandable jaws 4 of an expansion head 1 according to a further preferred embodiment of the present invention in a perspective illustration. In this embodiment, there are also two recesses 8 on the outer wall 7 of each of the sector-shaped expandable jaws 4, extending in the direction of the longitudinal axis of the expandable jaws 4. In this embodiment of the present invention, the recesses 8 are arranged at the lateral edge of the expandable jaws 4. The recesses 8 are each configured as bevels, which extend across the entire thickness of the expandable jaws 4, wherein opposing side surfaces of the expandable jaws are arranged parallel to one another. In this way, two each recesses 8 of adjacent expandable jaws together form a rectangular aperture extending to the center axis of the cylinder formed by the expandable jaws 4. As an alternative, other cross-sectional forms can be used here as well. Together, the recesses 8 correspond to about 40% of the surface of the envelope of the outer walls 7 of the set of expandable jaws in a closed state of the expansion head 1.

During the execution of an expansion process at a pipe end 13, a deformation of the pipe end 13, is respectively formed on the apertures formed by the recesses 8. During the execution of the first expansion process, the expenditure of force is also reduced for this embodiment compared to a first expansion process using a traditional expansion head without recesses 8 on the outer surface 7 of the expandable jaws 4. In contrast, a repetition of the expansion process after a rotation of the expansion tool by about 30° relative to the pipe end 13 requires a correspondingly increased expenditure of force compared to the second expansion process using a traditional expansion head without recesses 8 on the outer surface 7 of the expandable jaws 4.

The invention was described in detail above, with reference to preferred embodiments, wherein these exemplary embodiments are not to be viewed as limiting.

The invention claimed is:

1. An expansion head for expansion tools for hollow workpieces, having a central, longitudinal axis and suitable for ends of plastic pipes and metal-plastic composite pipes, comprising:
   a union cap having a guide flange directed radially toward the longitudinal axis, and
   a set of expandable jaws having outer wall portions which define outer surfaces adapted for contacting the hollow workpieces, each jaw received individually in the union cap by at least a portion of an inner flange thereof overlapping at least a portion of the guide flange so that the expandable jaws are radially movable in the union cap, wherein the set of expandable jaws is movable between a closed state and an expansion state, and in the closed state, an approximately cylindrical lateral surface comprising the outer wall portions of the set of expandable jaws is formed within an imaginary cylindrical surface consisting of an envelope of the outer wall portions of the set of expandable jaws,
   wherein each expandable jaw has a central region and is provided with at least one recess extending in a direction along the longitudinal axis along the expandable jaws so that in the closed state of the expansion head, the outer surface of the outer wall portions of the set of expandable jaws corresponds to 25% to 75% of the imaginary cylindrical surface of the envelope of the outer walls of the set of expandable jaws.

2. The expansion head according to claim 1, wherein the at least one recess is formed approximately in the central region of the outer wall portions of the expandable jaw.

3. The expansion head according to claim 1, wherein at least one of the expandable jaws has two or more recesses extending along the expandable jaws.

4. The expansion head according to claim 3, wherein the at least one recess is adjacent a second such recess on a common jaw each arranged at a lateral edge of an outer wall portion thereof.

5. The expansion head according to claim 4, wherein the recesses are respectively arranged at a lateral edge of the outer wall portions extending across an entire thickness of the expandable jaw.

6. The expansion head according to claim 3, wherein the recesses are arranged approximately symmetrically to a center axis of the outer wall portions of the respective expandable jaw, said center axis extending in the longitudinal direction of the expansion head.

7. The expansion head according to claim 1, wherein on a side of an expandable jaw facing away from the union cap, the expandable jaw is provided with a tapering or a chamfer.

8. The expansion head according to claim 1, wherein edges of the expandable jaws are rounded, broken, or chamfered.

9. The expansion head according to claim 1, wherein in the closed state of the expansion head, the surface of the outer wall portions of the set of expandable jaws corresponds to 40% to 60% of the imaginary surface of the envelope of the outer wall portions of the set of expandable jaws.

10. An expansion tool for hollow workpieces, particularly for ends of pipes made of plastic and plastic clad metals, comprising an expansion head according to claim 1.

11. The expansion head according to claim 2, wherein on a side of an expandable jaw facing away from the union cap, the expandable jaw is provided with a tapering or a chamfer.

12. The expansion head according to claim 3, wherein on a side of an expandable jaw facing away from the union cap, the expandable jaw is provided with a tapering or a chamfer.

13. The expansion head according to claim 4, wherein on a side of an expandable jaw facing away from the union cap, the expandable jaw is provided with a tapering or a chamfer.

14. The expansion head according to claim 5, wherein on a side of an expandable jaw facing away from the union cap, the expandable jaw is provided with a tapering or a chamfer.

15. The expansion head according to claim 2, wherein edges of the expandable jaws are rounded, broken, or chamfered.

16. The expansion head according to claim 3, wherein edges of the expandable jaws are rounded, broken, or chamfered.

17. The expansion head according to claim 4, wherein edges of the expandable jaws are rounded, broken, or chamfered.

18. The expansion head according to claim 5, wherein edges of the expandable jaws are rounded, broken, or chamfered.

19. The expansion head according to claim 6, wherein edges of the expandable jaws are rounded, broken, or chamfered.

20. The expansion head according to claim 2, wherein in the closed state of the expansion head, the surface of the outer wall portions of the set of expandable jaws corresponds to 40% to 60% of the imaginary surface of the envelope of the outer wall portions of the set of expandable jaws.

* * * * *